United States Patent [19]

Wilson et al.

[11] Patent Number: 4,822,951
[45] Date of Patent: Apr. 18, 1989

[54] BUSBAR ARRANGEMENT FOR A SWITCHGEAR ASSEMBLY

[75] Inventors: Robert A. Wilson, Ancaster; Kenneth N. Lam, Vancouver, both of Canada

[73] Assignee: Westinghouse Canada Inc., Hamilton, Canada

[21] Appl. No.: 205,275

[22] Filed: Jun. 10, 1988

[30] Foreign Application Priority Data

Nov. 30, 1987 [CA] Canada .................................. 553092

[51] Int. Cl.⁴ .......................... H02B 1/20; H02G 5/00
[52] U.S. Cl. ................................ 174/68.2; 174/149 B; 174/153 G; 174/156; 361/341
[58] Field of Search .................... 174/68.2, 70 B, 71 B, 174/72 B, 99 B, 100, 149 B, 152 G, 153 G, 155, 156; 361/341, 342, 355, 361

[56] References Cited

U.S. PATENT DOCUMENTS 2,006,931 7/1935 Powers ........................ 174/152 G X
4,739,441 4/1988 Galletly .............................. 361/341

Primary Examiner—Laramie E. Askin
Attorney, Agent, or Firm—Edward H. Oldham

[57] ABSTRACT

In a busbar arrangement for a switchgear assembly where the load buses pass through apertures in riser supply buses the load buses are supported by the supply buses by insulating grommet blocks occupying the space between the load buses and the inner edges of the apertures. The grommet blocks are held in place by sleeves on the load buses.

7 Claims, 1 Drawing Sheet

BUSBAR ARRANGEMENT FOR A SWITCHGEAR ASSEMBLY

FIELD OF THE INVENTION

This invention relates to a busbar arrangement for metal enclosed switchgear assemblies used to distribute electrical power from buses to a plurality of loads.

DESCRIPTION OF THE PRIOR ART

In accordance with a known construction, the supply buses and vertical riser buses in the metal enclosure which is used to enclose a large number of circuit breakers and their distributed power buses are placed with their major surfaces in parallel planes. The load buses from the circuit breakers are returned to the rear of the assembly through suitable perforations in the riser buses. In order to maintain the isolation of the load buses from the riser buses, it is found advisable to rigidly mount the load buses in rigid insulating sheets or blocks on each side of the riser buses. Because of the forces which may be involved during heavy loads, these insulating sheets or blocks which support the load buses must be of large size, either of machine stock or molding, both of which represent appreciable cost.

SUMMARY OF THE INVENTION

In accordance with the present invention, the load buses are supported in the riser buses by means of suitable insulating grommets fitting within the apertures in the riser buses and snuggly surrounding the load buses. The riser buses therefore provide the physical support for the load buses.

DESCRIPTION OF THE PREFERRED EMBODIMENT

Figure 1:
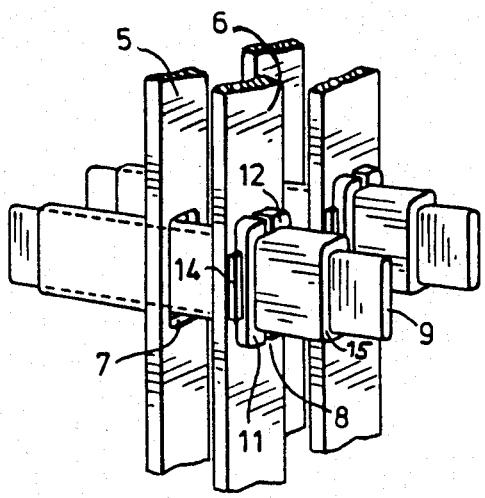
FIG. 1 is an isometric view of load buses passing through riser buses and supported by the riser buses.
Figure 2:
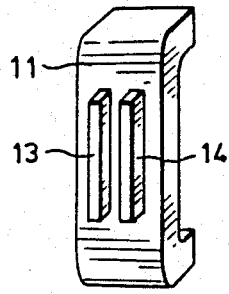
FIG. 2 is an isometric view of a support block incorporated in the assembly illustrated in FIG. 1.

Considering first FIG. 1, there is shown two pairs of riser buses 5 and 6 having apertures therein, designated 7 and 8, through which passes the load bus 9. The load bus 9 is supported in aperture 8 by means of a pair of grommet blocks 11 and 12, having a "U" shape, as illustrated in FIG. 2.

It will be seen that the outer surface of the grommet block 11 is shaped to conform to aperture 8 and occupy slightly less than half the perimeter of the aperture. A similar grommet block 12 occupies the other half perimeter of aperture 8. A pair of longitudinal projections 13 and 14 project from the outer surface of grommet block 11 and are spaced apart a distance substantially equal to the thickness of riser bus 6. An insulating sleeve 15 surrounds load bus 9 and conforms to the inner surface of grommet block 11. The height of projections 13 and 14 and the space between the grommet blocks 11 and 12 are such as to permit the grommet blocks to be inserted in aperture 8 after the load bus 9 has been passed through aperture 8. Sleeve 15 is now passed over bus 9 and fills the space between bus 9 and grommet blocks 11 and 12 and holds them firmly outwards so they conform to the inner surface of aperture 8 and the projections 13 and 14 snuggly engage the surfaces of riser bus 6.

Figure 3:
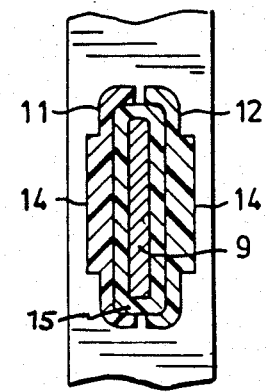
FIG. 3 is a sectional view of the portion of the load bus where it passes through the riser bus.

As shown in FIG. 3, in the assembled condition, load bus 9 is surrounded by sleeve 15 which snuggly fits over the load bus. The two grommet blocks 11 and 12 fit snuggly over sleeve 15 and fit within the aperture 8 in riser bus 6. A similar projection on grommet block 12 engages the surface of riser bus 6 on the other side of aperture 8. The buses may be assembled by passing load bus 9 through riser buses as required. Subsequently, a suitable number of grommet blocks 11 and 12 may be slipped into the aperture between the load bus and the riser bus. Sleeve 15 may then be slipped over the load bus locking the grommet blocks in place and ensuring that the load bus is snuggly supported by the riser bus. As will be seen, since the load bus is supported by the riser bus, which in turn has been rigidly supported from the framework of the assembly, there is no need for further support of the load buses, thus, eliminating the large and expensive support insulator blocks previously required.

The grommet blocks may be made of any suitable, relatively rigid, insulating material, which will firmly support the load buses in the riser buses. The sleeve material may be similarly selected from a suitable somewhat resilient insulating sleeving. Since all the grommet blocks and sleeves are substantially identical and may be put in place after the installation of the buses, the assembly is obviously economical and convenient.

While the grommet blocks have been shown to have the specific conformation it will be apparent that variations can be made within the scope of this invention. For example, the air space between the two grommet blocks 11 and 12 is shown in vertical arrangement. It is evident that under some circumstances it may be more convenient to rearrange the projections and air spaces and separate the blocks horizontally rather than vertically. It is also apparent that the sleeve 15, while shown as a single-piece sleeve, might under some circumstances be replaced by a two-piece sleeve, split either horizontally or in a vertical plane for convenience of assembly.

We claim:

1. In a switchgear assembly, a plurality of supply riser buses, a plurality of load buses passing through apertures in said riser buses, means to support said load buses in said apertures comprising a plurality of pairs of insulating grommet blocks shaped to conform to and engage the inner edges of said apertures, each pair of grommet blocks being seated in a respective aperture and defining, by their inner surfaces, an inner aperture having dimensions greater than the dimensions of an individual load bus, insulating sleeves on said load buses surrounding said load buses where they pass through said apertures and essentially completely filling the spaces between the load buses and said inner apertures.

2. A switchgear assembly as claimed in claim 1, wherein said grommet blocks are so dimensioned as to pass through said apertures in said riser buses and permit assembly but are prevented from escaping from said apertures when said sleeve covered load buses are inserted in said inner apertures.

3. A switchgear assembly as claimed in claim 1 or 2, wherein each pair of grommet blocks comprises a pair of substantially identical "U" shaped members with the base of the "U" equal to one dimension of the respective aperture in the respective riser bus and the legs of the "U" being slightly less than one half another dimension of the respective aperture in the respective riser bus and with a pair of projections on the outer side of the base of the "U" spaced apart a distance equal to the thickness of the respective riser bus wherby, when said pairs of grommet blocks are inserted in the apertures and forced apart by the insertion of said sleeve covered load buses, the pairs of grommet blocks are prevented from escaping from said apertures by the engagement of said projections with the respective riser buses.

4. A switchgear assembly as claimed in claim 3, wherein each pair of projections comprises a pair of parallel ridges spaced apart a distance equal to the thickness of a riser bus and having a length less than the length of the base of the "U".

5. A switchgear assembly as claimed in claim 1, wherein said apertures in said riser buses are rectangular and each pair of grommet blocks comprises a pair of substantially identical straps formed into a "U" shape with the width of the straps exceeding the thickness of a riser bus, the base of the "U" as measured overall not exceeding the major dimension of an aperture in a riser bus and the legs of the "U" as measured overall being slightly less than one half the minor dimension of said aperture, a pair of ridges on the outer surface of each strap parallel to the edges thereof and spaced apart a distance equal to the thickness of a riser bus, each ridge having a length less than said major dimension.

6. A switchgear assembly as claimed in claim 1, 2 or 5, wherein said sleeves are a resilient insulating material.

7. A switchgear assembly as claimed in claim 1, 2 or 5, wherein said grommet blocks are a substantially rigid insulating material.

* * * * *